June 2, 1953 — J. R. MADEIRA — 2,640,582
BELT CONVEYER
Filed Nov. 29, 1950 — 3 Sheets-Sheet 1
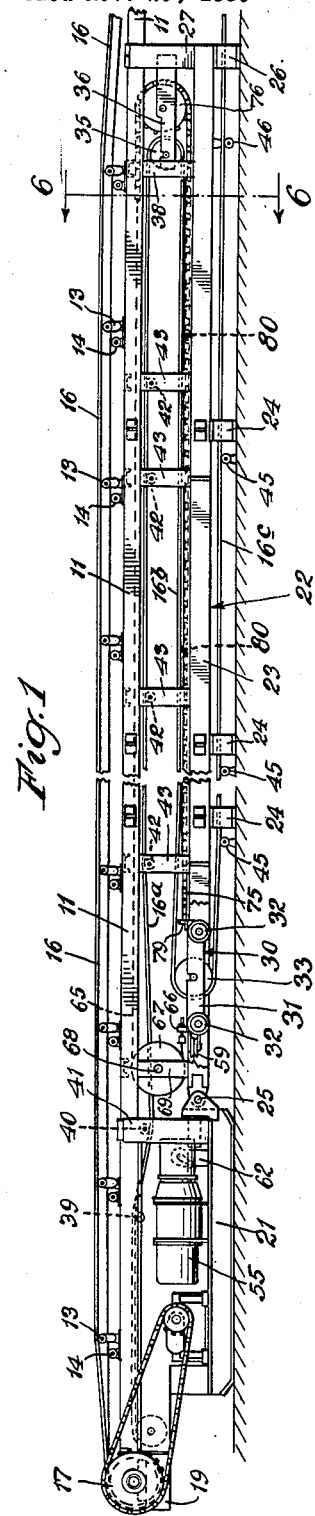
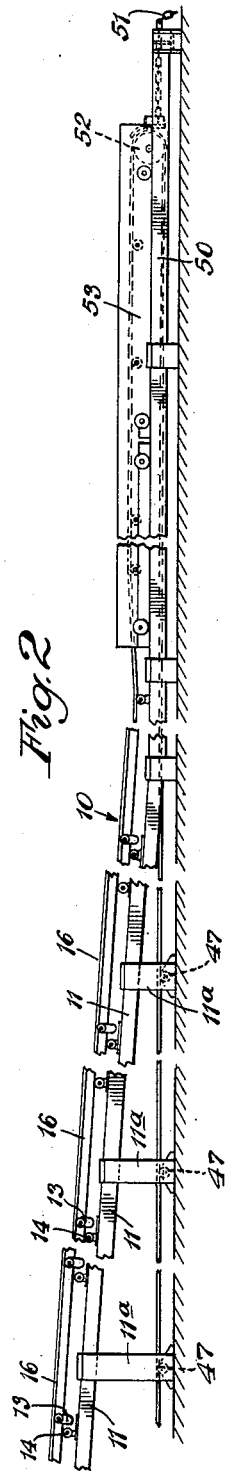
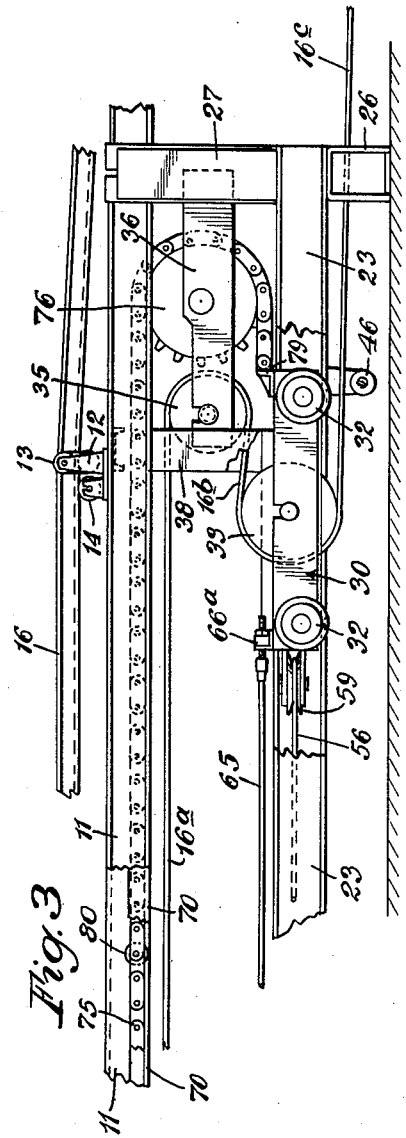
Inventor
John R. Madeira
by Murray G. Gleeson
Attorney

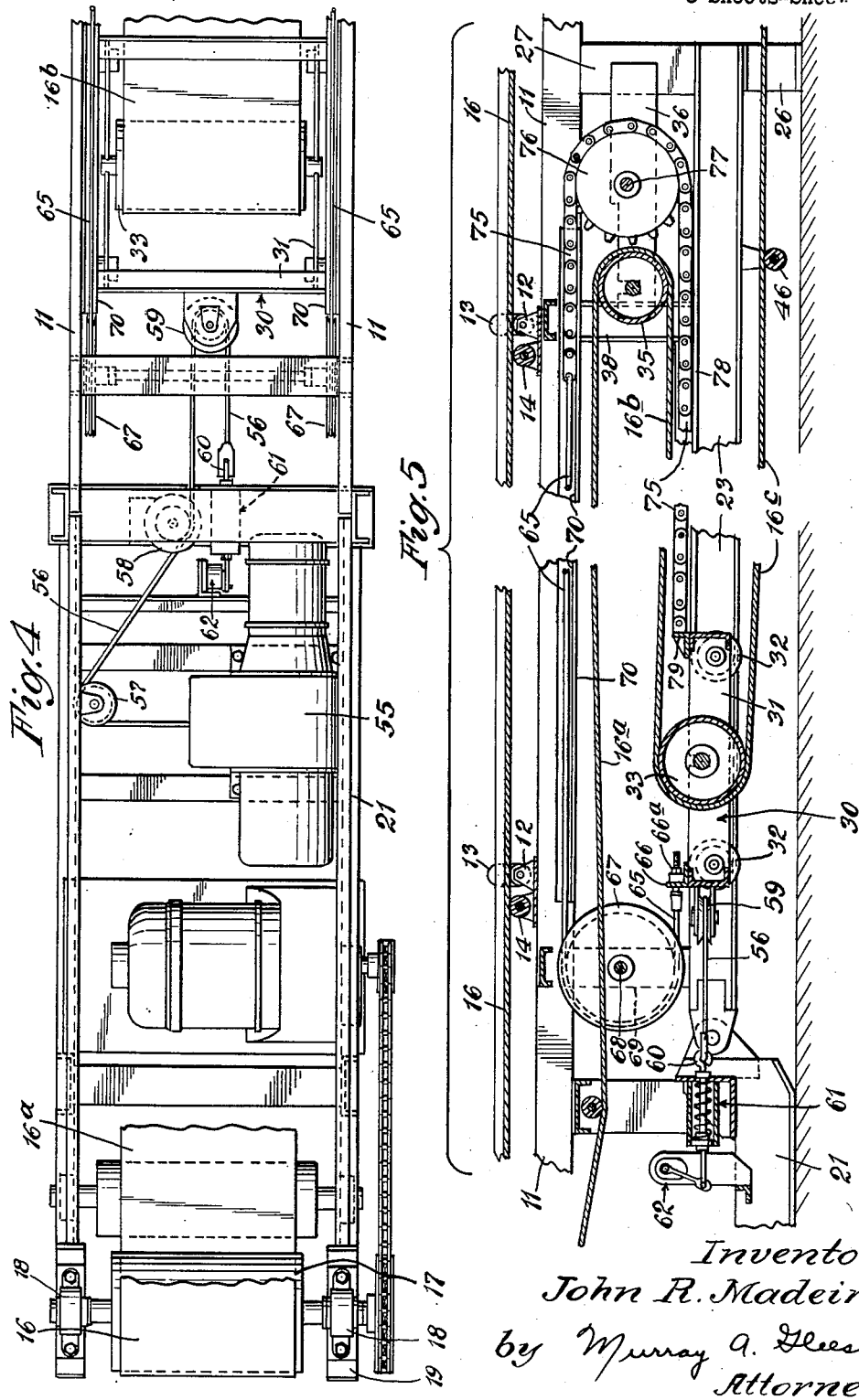

Patented June 2, 1953

2,640,582

UNITED STATES PATENT OFFICE 2,640,582

BELT CONVEYER

John R. Madeira, Chicago, Ill., assignor to Goodman Manufacturing Company, Chicago, Ill., a corporation of Illinois Application November 29, 1950, Serial No. 198,176

2 Claims. (Cl. 198—139)

This invention relates to improvements in belt conveyors of the sectional type, and more particularly to extensible belt conveyors having take-up means for storing a substantial length of belt in operative position for use when the overall length of the conveyor as a whole is increased or decreased by introducing or taking out one or more sections of the belt supporting structure.

With extensible conveyor belt structures of the kind generally described above, both the upper load-carrying flight and the lower return flight of the belt are supported on rollers at frequent intervals, excepting as to that portion of the lower flight which is disposed or stored in reversed telescopic relation in the take-up mechanism. Heretofore, no practical means has been proposed for supporting such reversed portion of the flight so as to permit a relatively wide range of extension or retraction of the overall length of the conveyor.

With the foregoing considerations in mind, it is the principal object of this invention to provide an improved take-up for storing relatively long telescopic belt portion, including means automatically extensible and retractable for supporting such belt portion in all permissible positions of extension of the take-up means.

Other objects and advantages of the invention will appear from time to time as the following description proceeds.

The invention may best be understood by reference to the accompanying drawings, in which:

Figure 1 is a side view of one end of a belt conveyor embodying a telescoping take-up and release device for the belt, together with supporting means for the telescoping portion of the return flight of the conveyor, constructed in accordance with the present invention, but with an intermediate portion of the take-up mechanism broken away;

Figure 2 is a side view of extended portions of a belt conveyor structure, such as may be connected to the right-hand end of the structure shown in Figure 1, to form a substantial portion of conveyor beyond the take-up mechanism thereof;

Figure 3 is a fragmentary detailed view in side elevation of the portion of the take-up mechanism shown at the right end of Figure 1, with parts broken away to show structural details thereof, and with the take-up mechanism adjusted to the position in which the belt is extended to its maximum length on the conveyor;

Figure 4 is an enlarged plan view of the rear or left-hand end of the conveyor structure shown in Figure 1, with parts broken away to show details of construction at the belt driving end of the conveyor;

Figure 5 is a composite fragmentary detailed view in vertical section showing the front and rear portions of the take-up mechanism;

Figure 6:
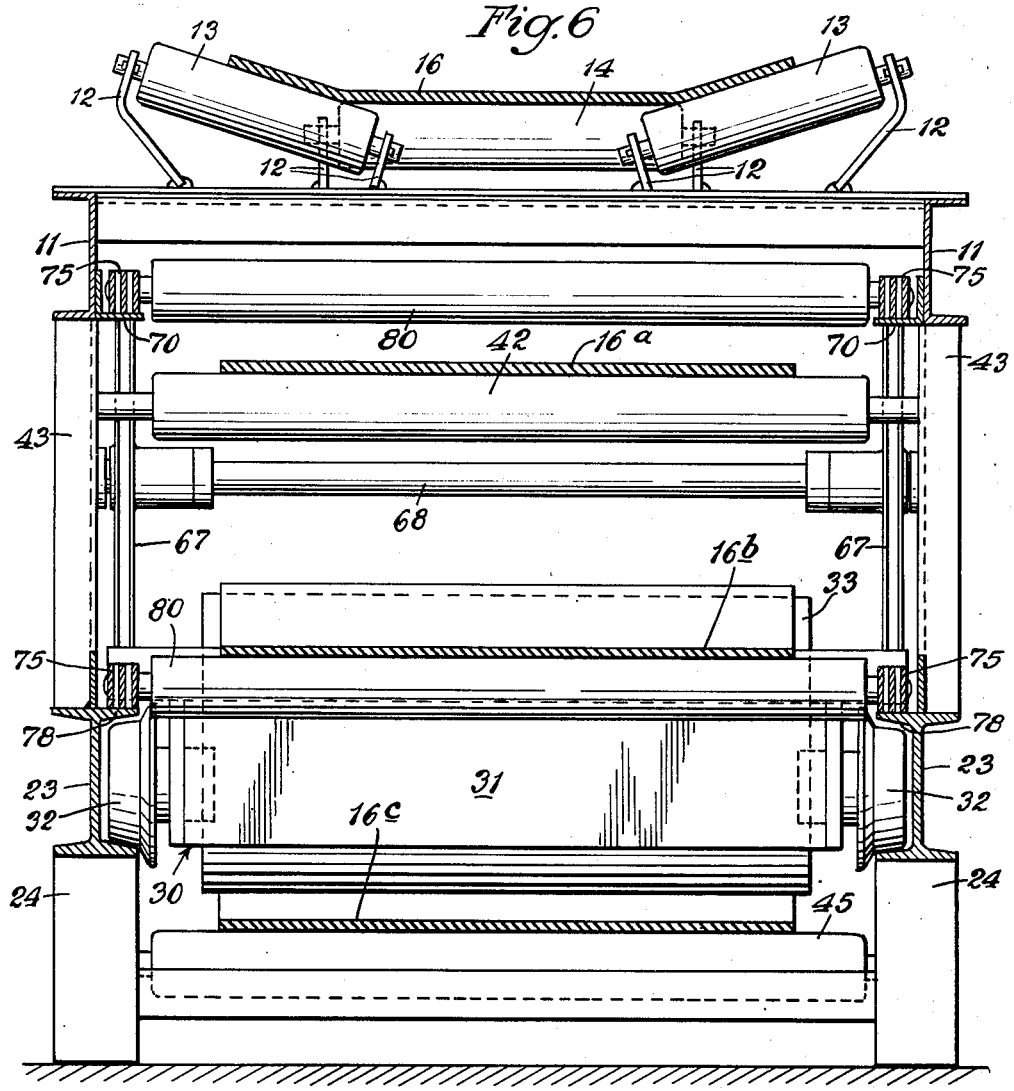
Figure 6 is an enlarged detailed section taken on line 6—6 of Figure 1.

Referring now to details of embodiment of my invention illustrated in the drawings, Figures 1 and 2 together show fragmentary sections of a belt conveyor indicated generally at 10, which in complete form may extend for considerable lengths of, say, 200 feet or more. The conveyor is made up of a belt drive and take-up means shown in Figure 1, and an extended material-carrying portion and loading frame shown in Figure 2. Side channel members 11 extend the length of the conveyor, suitably supported as by a plurality of upright standards 11a disposed at varying distances and inclinations thereto, as indicated in Figure 2. The channel members 11 have roller supports 12, 12 for inclined idling guide rollers 13, and horizontal idlers 14 for supporting the upper material-carrying flight of the belt 16 in a manner somewhat similar to that shown and described in my Patent No. 2,373,839, issued on April 17, 1945.

The belt 16 is driven by a driving pulley 17 journalled in a support 18 which, in turn, is mounted on standards 19 and a platform 21 at the outby end of the conveyor. The details of the conveyor belt supporting structure and the power driving means therefor need not be described in detail, since they form no part of the present invention.

A take-up mechanism indicated generally at 22 is mounted on the conveyor structure in front of the platform 21 and below the spaced side channel members 11. This take-up mechanism is preferably of sufficient length to accommodate or store a substantial portion of the return run or flight of the belt in reversely telescoped relation, so as to permit extension or retraction of the conveyor, as a whole, without requiring any splicing or other change in the length of the belt itself. Said take-up mechanism comprises as its main elements a pair of elongated channel members 23, 23, herein consisting of I beams, mounted on a plurality of longitudinally spaced supports 24, 24. The rear ends of the I beams 23 are connected as by pivot pins 25 to the front end of the platform 21. The front ends of said I beams terminate at upright ground supports 26, 26 which may also be extended upwardly by side frame members 27, 27 connected to the outer sides of the side channel members 11, 11 as seen at the right end of Figure 1.

A carriage 30 is mounted for slidable movement along and between the I beams 23. In the form shown, the carriage consists of an open frame 31 having two pairs of flanged wheels 32, 32 at opposite ends thereof, the rims of which ride between the inner flanges of the I beams 23. A tensioning roller 33 is rotatably mounted transversely of the carriage frame 31 in position to form the rear tensioning member for the belt.

Adjacent the opposite or front end of the take-up mechanism is mounted a fixed tensioning pulley 35, disposed transversely beneath the side channel members 11. The ends of said roller are journalled in longitudinally extending side plates 36, 36 having their front ends connected to upright intermediate supports 38 between the I beams 23 and the side channel members 11.

The lower run or flight of the belt 16 is trained from below the drive pulley 17 over an idler roller 39 and then under a roller 40, the latter roller being journalled in upright standards 41, 41 at the forward end of the platform 21. From thence, the belt passes over a plurality of longitudinally spaced transverse supporting rollers 42, 42 on upright intermediate supports 43, 43 disposed in upright position between the side channel members 11 and the I beams 23. From the forwardmost idler roller 42, the lower run of the belt passes downwardly and in reversed direction around the idler pulley 35 to the tensioning pulley 33 on carriage 30. For convenience, the portion 16b of the belt extending between pulleys 35 and 33 may be termed the intermediate reversed portion of the take-up device. From tensioning pulley 33, the belt passes forwardly at a level below the I beams 23, where it may be supported by suitable rollers 45, 45 which may be mounted on the mine floor, and also over roller supports 46 which may depend from the I beams 23. After the lower run passes beyond the front end of the take-up mechanism, it may be suitably supported as by rollers 47, 47 mounted on the upright standards 11a, 11a as shown in Figure 2.

The forward or receiving end of the conveyor may be provided as usual with a frame 50 adapted to be anchored to the ground as by a chain 51 and having an idler pulley 52 at its forward end, about which the belt is trained for return movement. The frame 50 may also be provided with side spill plates 53 to aid in loading material on the belt. Further details of the conveyor structure shown in Figure 2 need not be described as it forms no part of the present invention.

Means are provided for moving the carriage 30 of the take-up mechanism horizontally in a direction to lengthen or shorten the upper flight of the belt as may be necessary when it is desired to increase or decrease the conveyor by adding or removing one or more sections beyond the take-up mechanism.

In the illustrative form of tension adjusting means shown herein, the movement of the carriage is effected under control of a hoist, indicated generally at 55, having a flexible cable 56 wound thereon and trained over idlers 57 and 58 suitably mounted on the framework of the platform 21, and with the cable 56 extending forwardly about a pulley 59 at the rear end of the carriage 30. From the pulley 59, the cable 56 returns rearwardly to an eyebolt 60, forming part of a yieldable anchor device, indicated generally at 61, mounted at the front end of the platform 21, as shown in Figure 5. The arrangement of the hoist 55, cable 56, eyebolt 60 and yieldable anchor device 61 is substantially the same as has been disclosed in detail in my copending application bearing Serial Number 109,541, filed August 10, 1949, wherein the hoist may be manually controlled for lengthening or shortening the upper run of the belt. Said hoist may also be automatically controlled, depending upon the tension of the belt transmitted through the cable 56 to the yieldable anchor 61 and, from thence, through a limit switch indicated generally at 62, to maintain a substantially uniform tension on the belt while the conveyor is in operation. Since details of the manual and automatic control mechanism for the hoist 55 are fully disclosed in my aforesaid copending application, further details thereof need not be described or disclosed as they form no part of the present invention.

Referring now more particularly to the novel means for supporting the intermediate reverse portion 16b of the belt, Figure 5 shows a pair of cables 65 which are anchored at one end to a suitable abutment 66 at the front end of the carriage 30. Said cables extend rearwardly and are trained about relatively thin sheaves 67 journalled at opposite sides of the supporting framework. As shown herein, said sheaves are carried on a transverse shaft 68 having its opposite ends supported on uprights 69 extending between the I beams 23 and the channel members 11. The sheaves 67 are sufficiently large in diameter to carry the cable 65 upwardly above the level of the upper return flight 16a of the belt. Accordingly, the cables 65 are trained forwardly from the sheaves 67 at opposite sides and above the level of the upper return flight 16a, as shown in Figures 4 and 5.

A pair of angle bars 70, 70 are mounted along the inner faces of the side channels 11 from the sheaves 67 to points adjacent the belt tensioning pulley 35 at the front end of the take-up mechanism. Each of the cables 65 has its forward end connected to a length of chain 75 which forms, in effect, a flexible extension thereof. The chains 75 are trained over idler sprockets 76, 76 which are disposed forwardly of, and are somewhat larger in diameter than, the tensioning pulley 35. As shown herein, the idler sprockets 76 are mounted at opposite ends of a shaft 77 journalled in the side plates 36, which also support the ends of the tensioning pulley 35. The chain portions 75, after passing downwardly around the sprockets 76, extend rearwardly beneath the intermediate reversed portion 16b of the belt. As will be seen in Figure 6, the chain portions 75 are slidably mounted on the inwardly extending upper flanges 78, 78 of the I beams 23. The ends of the chain portions 75 are connected to abutments 79 at the front end of the carriage 30.

The lengths of the cables 65 and the chain portions 75 connected thereto are so proportioned and arranged that, when the carriage 30 is in its rearwardmost position for maximum storage of belt on the take-up mechanism, as shown in Figure 1, the chain sections 75 are of sufficient length to extend upwardly around their respective sprockets and, from thence, rearwardly a short distance in engagement with, and slidably supported on, the inwardly extending angle bars 70, as seen in Figures 5 and 6. The tension of the cables 65 and chains 75 may be adjusted as by means of threaded take-up nuts 66a, so as to be maintained in fairly taut condition. As the carriage 30 is moved forwardly into various adjusted positions along the I beams 23, the cables 65 will be drawn downwardly around the sheaves 67 to the same extent that the chain sections 75 are payed out upwardly around the sprockets 76. Accordingly, those portions of cables 65 and chain sections 75 associated therewith, which may be moved above the belt portion 16a, are slidably supported along the flanges 78, 78 of the I beams in all positions of longitudinal adjustment of the carriage 30.

A plurality of transversely disposed supporting rollers 80, 80 extend between and are supported at opposite ends on the chain sections 75, 75 at a plurality of horizontally spaced points therealong, so as to provide positive support for the intermediate reversed return run or flight 16b of the belt in all positions of adjustment of the take-up mechanism. In the form shown herein, the supporting rollers 80 are relatively small in diameter and have their ends suitably journalled in certain of the chain links, as shown in Figures 5 and 6.

As will be seen from Figures 3 and 5, one or more of the supporting rollers 80 will be carried upwardly with the chains 75 around the chain sprockets 76 when the carriage is moved forwardly to shorten the intermediate reversed portion 16b of the belt. Thus, in Figure 3 where the carriage is substantially at its forwardmost limit of movement, all the transverse supporting rollers 80 will be carried upwardly and out of supporting relation to the belt, since such vertical support of the belt is not required in this position.

Although the transverse belt supporting rollers 80 may be provided at any suitable intervals along the chains 75, 75, I find that, in practice, with belt conveyors of the kind usually employed in mines, it is only necessary to space said rollers sufficiently close together to support the belt against sagging due to its own weight. For instance, with a standard commercial form of belt conveyor, a belt under normal operating tension will sag of its own weight as much as 9 inches in 25 feet. It is, therefore, desirable to provide roller supports at intervals of considerably less than 25 feet for the entire length of the return run.

Although roller supports can readily be provided on the conveyor structure at frequent intervals beneath the uppermost return run 16a, and also beneath the lowermost return run 16c in the take-up mechanism, it is quite a different matter to provide roller supports for the intermediate reversed run of the belt 16b because any roller supports which are in fixed position on the framework will interfere with the lengthening or shortening of said intermediate reversed section during the operation of the take-up mechanism. So far as I am aware, no practical means has heretofore been devised for providing a plurality of roller supports for the intermediate reversed run as in the present invention, wherein the roller supports 80, 80 are automatically moved into and out of proper supporting relation to said reversed run as required for various positions of adjustment of the take-up mechanism.

Moreover, in the absence of such movable supporting means, it has heretofore been considered impractical to provide belt storage or take-up means to accommodate more than about 20 feet of intermediate reversed run of the belt for extension of the conveyor. It has, therefore, been considered necessary to splice the belt whenever the overall length of the conveyor was to be extended or shortened more than about 20 feet.

With my novel form of take-up mechanism, including means automatically adjustable to support the intermediate reversed portion 16b of the belt as hereinabove described, it is possible to store up to one-half the total length to which it may be desired to extend a belt conveyor of this type. In other words, a take-up mechanism can be provided to store as much as 100 feet of belt on the intermediate return run or flight 16b, so as to permit the extension of such a conveyor to approximately 200 feet, without requiring any belt splicing and with the belt fully maintained in operative condition for any length to which the conveyor may be adjusted from time to time.

Although I have shown and described certain embodiments of my invention, it will be understood that I do not wish to be limited to the exact construction shown and described, but that various changes and modifications may be made without department from the spirit and scope of the invention as defined in the appended claims.

I claim:

1. In a belt conveyor, an extensible elongated frame having a plurality of belt supporting rollers therealong, take-up means including two tensioning pulleys normally disposed longitudinally of said frame for reversing the direction of the lower return run of the belt, a carriage for one of said tensioning pulleys movable longitudinally of said frame for adjusting the length of said reversed run of the belt, supporting means for said reversed run including a pair of flexible members guided on the frame in parallel orbital paths beyond opposite sides of said reversed run and connected to said carriage for adjustable movement therewith, said flexible members having a plurality of transverse belt supporting cross members therebetween, the lower run of said supporting means being movable in a path parallel to and below the reversed run of the belt to position said cross members in supporting relation to the latter, and the upper run of said supporting means being movable in a path above and in non-engaging relation to the belt.

2. A belt conveyor structure in accordance with claim 1, wherein the guide means for said flexible members includes end guides disposed beyond the limits of longitudinal adjustment of the reversed run of the belt.

JOHN R. MADEIRA.

References Cited in the file of this patent

UNITED STATES PATENTS

| Number | Name | Date |
| --- | --- | --- |
| 895,776 | Liggett | Aug. 11, 1908 |
| 925,928 | Lueke | June 22, 1909 |
| 1,041,439 | Dearborn | Oct. 15, 1912 |
| 2,452,980 | Beltz | Nov. 2, 1948 |